United States Patent Office 2,799,564
Patented July 16, 1957

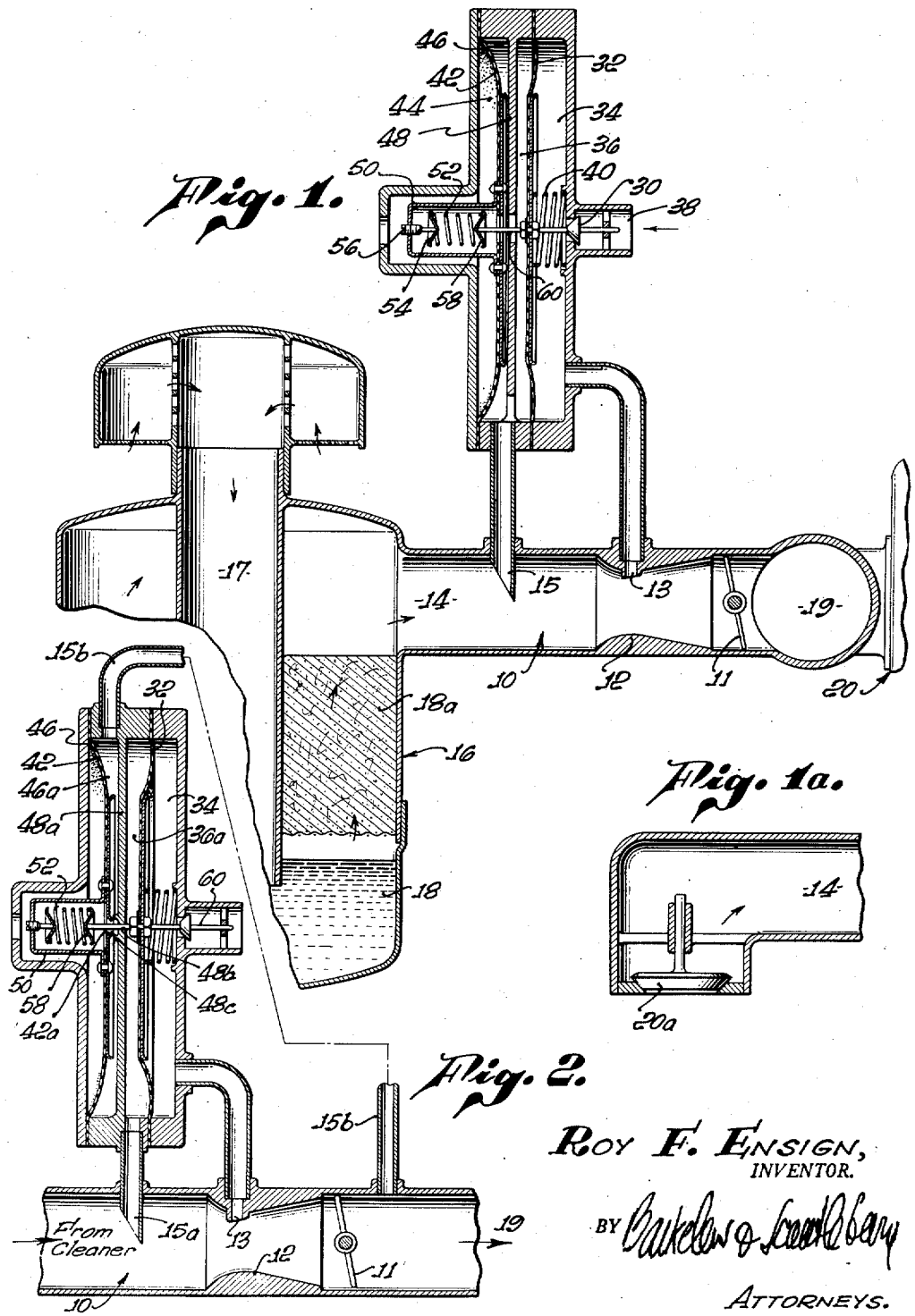

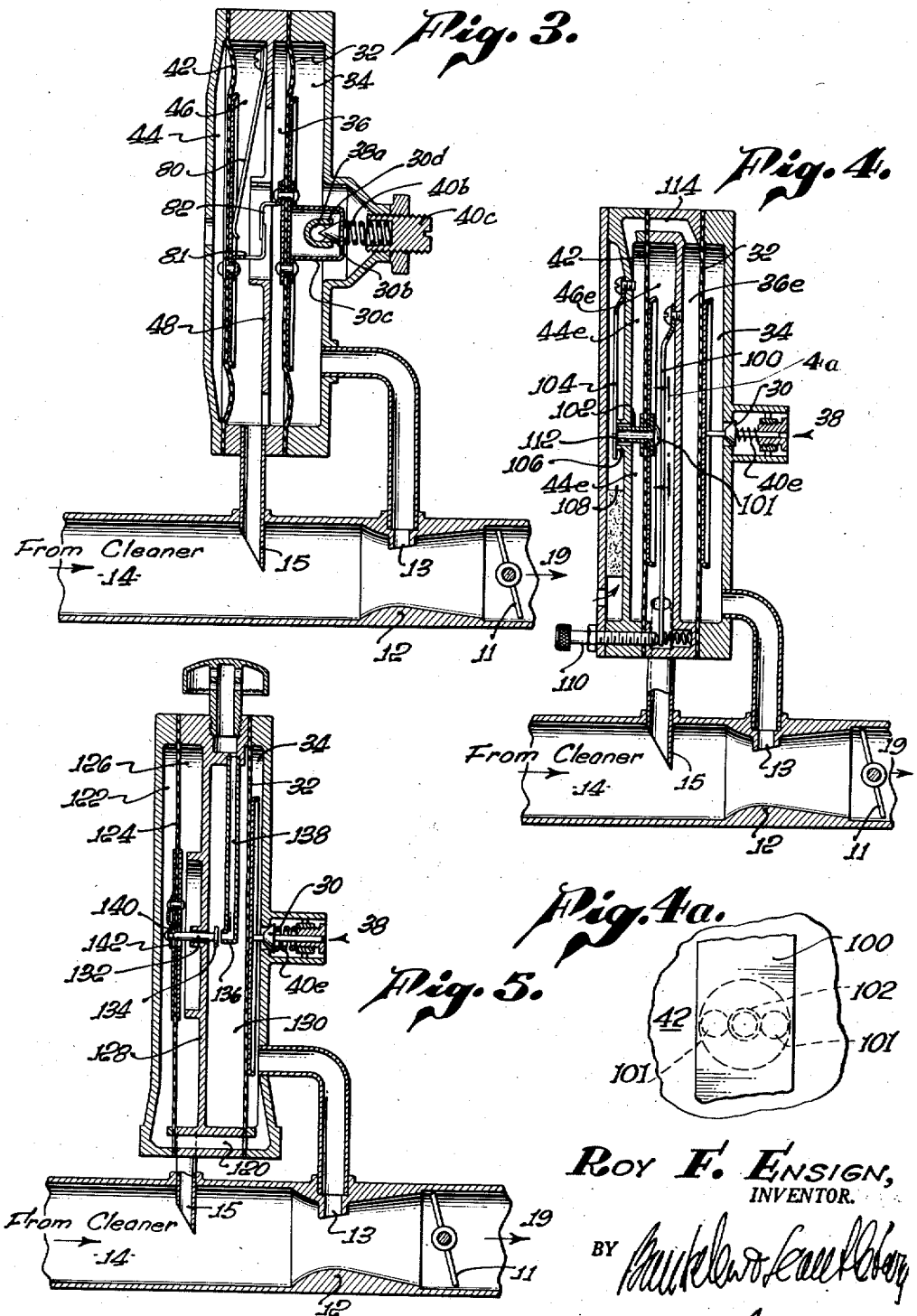

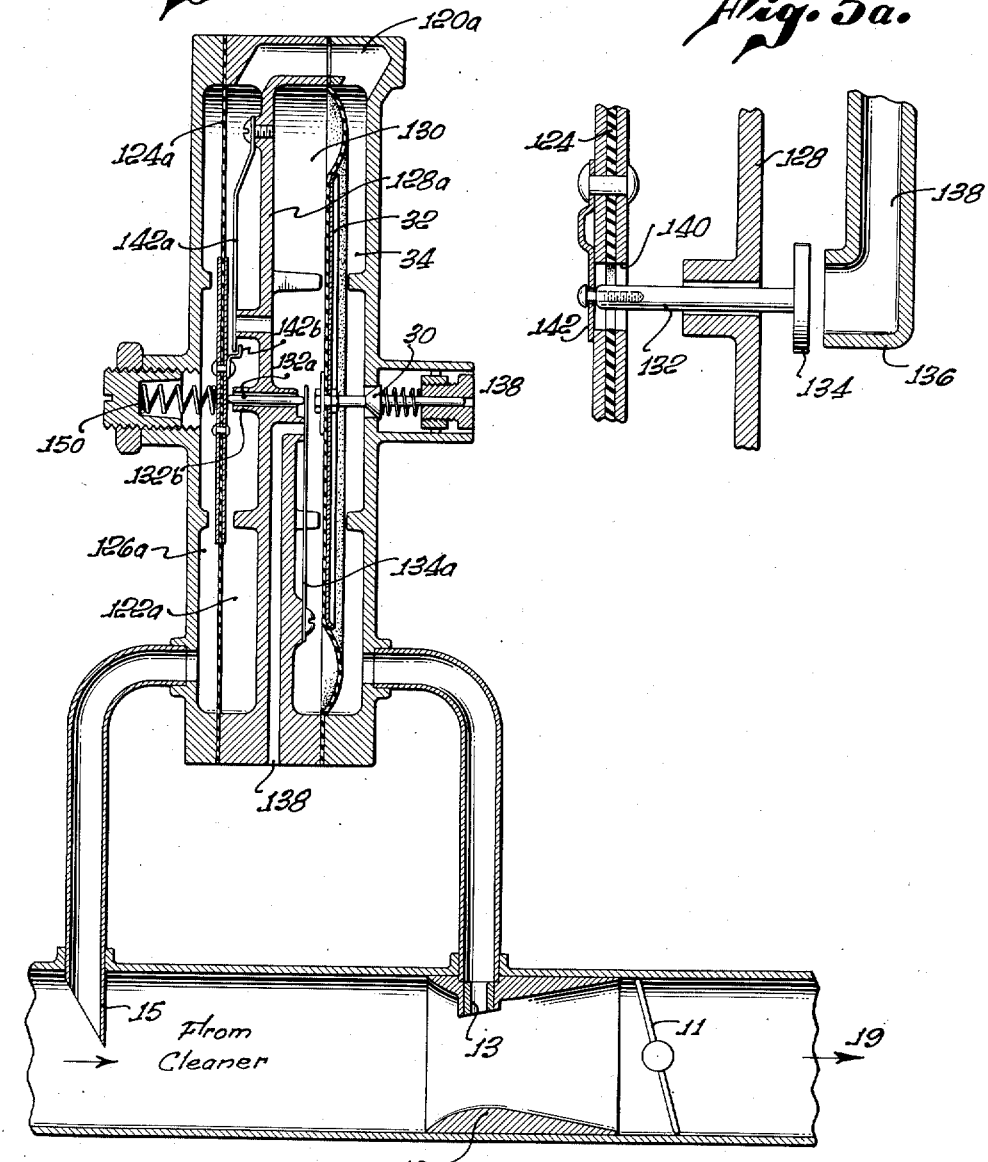

2,799,564

GASEOUS FUEL FEED SYSTEMS FOR INTERNAL COMBUSTION ENGINES

Roy F. Ensign, San Marino, Calif., assignor to Ensign Carburetor Company, Huntington Park, Calif., a corporation of California Application December 9, 1952, Serial No. 324,986

6 Claims. (Cl. 48—184)

The present invention has to do with gaseous fuel feed systems for fuel consuming devices which take their fuel via a fuel nozzle that is subjected to a fuel inspiring depression developed by the velocity of air flow. Typical is an internal combustion engine fed with gaseous fuel via a fuel nozzle which is subjected to the velocity depression attendant the flow of air drawn by the engine through the throat of a venturi. In such systems the gaseous fuel is fed to the fuel nozzle under control of a pressure regulator which is adjusted to deliver fuel at a pressure slightly under the normal standing pressure of the effective surrounding atmosphere. Typically the regulator delivers its gaseous fuel to the fuel nozzle at a pressure of about one-quarter inch of water under the effective atmospheric pressure, to insure closure of the regulator valve when the pressure in the delivery chamber becomes atmospheric with the engine standing.

The depression at the fuel nozzle in the venturi throat then has to be at least that one-quarter inch in order to draw in any fuel at all; and in the absence of some special provision, no fuel or insufficient fuel will be drawn in during starting turn-over or idling operation of the engine. Typically, starting fuel is provided by choking the air intake of the venturi; and idling fuel is provided via an idling by-pass which applies suction from the engine manifold inside the throttle to the regulator outlet.

The present invention utilizes a pressure drop due to a permanent obstruction in the air intake to modify the regulator action to make it deliver fuel at a higher than normal pressure, especially for starting and idling operations. Such an obstruction is preferably one that engenders a definite minimum pressure drop at minimum air flow; such for instance as a weighted air intake valve. In practice, the commonly used oil-bath type of air cleaner provides just such a weighted valve and such a pressure drop. The invention utilizes such a pressure drop to relatively increase the reference pressure which controls the pressure at which the regulator valve opens, thereby to increase the delivery pressure of the regulator but without correspondingly increasing the pressure being applied to the fuel nozzle to draw fuel.

As will be shown in the following detailed descriptions, by "reference pressure" the invention contemplates any pressure tending to open the regulator delivery valve, whether that pressure is exerted by fluid pressure on the valve controlling diaphragm, or exerted through other media (e. g. springs) acting on the valve or its operating system.

The invention as above generally outlined will be more fully understood from consideration of the following detailed descriptions of illustrative embodiments shown in the accompanying drawings wherein:

Fig. 1 is a schematic sectional showing of one illustrative form of gaseous fuel feed system embodying the present invention;

Fig. 1a shows a modification of the device causing the pressure drop, in the form of a simple weighted valve;

Fig. 2 shows a modification in such a system as shown in Fig. 1;

Fig. 3 shows another modification in such a system as shown in Fig. 1;

Figs. 4, 5 and 6 show further modified illustrative forms of gas feed system in accordance with the present invention;

Fig. 4a is a detail planar view taken as indicated by line 4a on Fig. 4; and

Fig. 5a is an enlargement of a detail of Fig. 5.

Reference is first made to the showings in Figs. 1 and 1a. Therein a typical engine carbureter is schematically indicated, including a mixture passage 10 controlled by throttle 11, having a venturi 12 with a gas feed nozzle 13 delivering at its throat. Mixture passage 10 delivers to intake manifold 19 of engine 20. Air intake passage 14 has balance passage 15, in the form of a Pitot tube, communicating with it to pick up the total air pressure; and the air intake is controlled, in Fig. 1, by the typical oil-bath cleaner 16. Such a cleaner typically involves an air tube 17 having its lower end submerged to a distance of, say, one-half inch, in oil bath 18. That distance represents the pressure drop which occurs in the cleaner at minimum (any) air flow. Above the oil bath the air flows through a filter plug 18a where the oil and dirt carried by the air are filtered out. For the purposes of the present invention it is only the pressure drop function of the cleaner that plays a part; and that function may be performed by any air intake device that imposes a definite or sufficiently large pressure drop at minimum air flow. Another such device is the weighted air intake valve 20a shown in Fig. 1a; where the weight of the valve may be so related to its effective air intake area as to provide the same pressure drop, say ½ inch water, as in the cleaner.

In Fig. 1, the essentials of a fluid pressure regulator are illustratively shown, including a pressure controlling valve 30 operated by diaphragm 32 which has one face exposed to outlet pressure in delivery chamber 34 and the other face exposed in reference chamber 36 to the reference pressure picked up by tube 15. The arrangement is such that pressure in 34 tends to close valve 30 and pressure in 36 tends to open it. As here shown illustratively in very simple form, valve 30 closes in such a direction that pressure in the initial intake 38 on the valve tends to close it; and a spring 40 may also tend to close it. The closing spring may be omitted if desired, and the valve closed simply by a regulated intake pressure on it. On the other hand, the valve may be arranged, as for instance shown in Fig. 3, to close against the inlet pressure instead of with it. In that arrangement, a spring closes the valve against the inlet pressure. And in any of the various known arrangements of the valve and its connection with its operating diaphragm, the various forces are so adjusted and related that the valve will close when pressures are equal in delivery chamber 34 and reference chamber 36, and will open when the pressure in chamber 34 is less than that in 36 by say ¼ inch water. In other words, the normal valve closing force, of spring 40 and/or the initial inlet pressure on the valve, is equal to the total force of a fluid pressure of, say, ¼ inch of water on diaphragm 32. To insure the valve always opening with small or no variation from such a set delivery pressure, the initial inlet pressure on valve 30 tending either to close or open it should preferably be well regulated, as for instance by a regulator stage preceding the one here illustrated. That applies to the forms of Figs. 1 to 4; the forms of Figs. 5 and 6 automatically compensate for variations in the normal valve closing force.

In Fig. 1, if reference pressure chamber 36 is simply connected to the same static pressure that applies to nozzle 13 (for instance, if balance tube 15 is simply connected to chamber 36) the relative velocity depression in the venturi throat will not be sufficient, at starting and on idling, to open valve 30 at all, or enough to provide sufficient fuel. In the form shown in Fig. 1 the invention insures that valve opening by the following provisions.

A second diaphragm 42 is exposed on one face to atmosphere in a chamber 44 and on its other face to the pressure in a chamber 46 which is in communication with reference pressure chamber 36 of diaphragm 32. In fact, chambers 36 and 46 are functionally one, being separated only by the perforated wall 48 which merely acts as a limiting stop for inward diaphragm movement.

Diaphragm 42 carries on its outer face a cage 50 enclosing a compression spring 52 whose one end is seated against a seat 54 adjustable by a screw 56 mounted in the cage. Cage 50, it may be noted, is imperforate so as not to afford a communication between 44 and 46. The other spring end seats on a seat 58 which, when diaphragm 42 is not drawn to the right by lowered pressure in 46, is pressed by the spring against the diaphragm. Under those conditions, when the engine is standing, diaphragm 42 floats freely with atmospheric pressure on both faces and consequently spring 52 exerts no pressure on the end of the extended valve stem 60, which extends from valve 30 and is secured in diaphragm 32. However, when the pressure in 46 is reduced sufficiently below that in 44, diaphragm 42 is drawn to the right against wall 48 and spring seat 58 then seats on valve stem 60 to transmit to that stem, and the valve, a valve opening force which is adjustably set as to amount by the setting of screw 56. Assuming, for example, that the effective areas of diaphragms 32 and 42 are equal and that the pressure drop in cleaner 16 or equivalent air intake obstruction is as great as or greater than the pressure differential on diaphragm 32 necessary to open valve 30, then if the obstruction pressure drop is applied to chamber 46 to move diaphragm 42 to the position shown, spring 52 can be adjusted to apply sufficient valve opening pressure to valve stem 60 to substantially equalize all the forces acting on the valve. In the illustration here given, valve 30, standing, is closed by a force equal to ¼" water on the effective area of diaphragm 32. The cleaner pressure drop, of say ½" water, applies twice that force to diaphragm 42 to move it to the position shown in Fig. 1. Spring 52 then applies to valve stem 60 an opening force that is, say substantially or just equal to the ¼" water on the diaphragm area. Under those circumstances the valve will then require only a very slight additional opening force to be exerted on it from diaphragm 32, or will be floating in equilibrium, or will be actually opened to some extent. It will suffice for this explanation and for proper operation that spring 52 be adjusted to exert on the valve an opening reference force substantially just equal to the normal valve closing force, which substantially just puts the valve floating in equilibrium under the forces tending to open and close it, excepting the differential force due to velocity depression in the venturi acting on the valve operating diaphragm 32.

When the engine is standing, the pressures on the opposite faces of both diaphragms 32 and 42 are all atmospheric. Diaphragm 42 is therefore free and spring 52 exerts no opening reference pressure on valve 30. Diaphragm 32 is also free and valve 30 is therefore held closed by the set closing pressure. In the illustration here given that pressure is equal to a differential of ¼" water over the effective face of diaphragm 32.

On turning over the engine to start, and drawing in air through the air cleaner or equivalent obstruction, a depression of say ½" water is applied to both the balance tube 15 and fuel nozzle 13. Diaphragm 42 is drawn to the right, applying the valve opening pressure of spring 52. Diaphragm 32 is in substantial balance with the ½" depression applied to both faces. Valve 30 is either thereby actually opened to deliver fuel to the nozzle or is put in equilibrium so that then the very slight venturi throat depression applied to delivery chamber 34 during starting will open the valve. And on idling operation, the slight venturi throat depression will also open the fuel valve to provide fuel in proportion to the air passing through the venturi. If a relatively rich mixture is desired or necessary for starting and idling, screw 56 can be set so that valve 30 instead of being put just in equilibrium by pressure of spring 52, will be positively opened when that spring pressure is applied.

With valve 30 in balance, the pressure at which fuel is maintained in delivery chamber 34 and delivered to nozzle 13 will be substantially equal to the reference pressure in chamber 36. And that same condition of fuel delivery applies also to normal operation in all ranges; as the cleaner depression always operates to actuate diaphragm 42 as described. Thus, in normal operation of the engine in medium and higher ranges the fuel supply will always be substantially if not exactly proportionate to the air volume, because the pressure at which fuel is delivered to nozzle 13 will be always substantially the pressure which is picked up by Pitot balance tube 15 and transmitted as a reference pressure to diaphragm 32.

Fig. 2 shows a desirable modification of such a system as that shown in Fig. 1. In any such system where the pressure drop through such an oil filter air cleaner is utilized to increase the valve opening reference pressure, the oil in the cleaner may in some circumstances not be in position to give that pressure drop for idling operation. If the engine is operated for any length of time at wide open throttle and high speed the air flow through the cleaner may carry all or most of the hydrostatic head of oil up into the filter plug where it will remain as long as the fast air flow continues. That condition does not affect proper operation of the regulator as long as fast air flow exists, as the pressure drop in the air cleaner at that air flow velocity is higher than the pressure drop at low air velocities and the fuel pressure regulating valve therefore is kept in proper operation. However, if the throttle is suddenly subsequently closed the engine will drop to idling speed before the cleaner oil can drop out of the filter plug to provide the hydrostatic head necessary to give the required pressure drop at low air speeds. The arrangement of Fig. 2 overcomes that difficulty.

In Fig. 2, parts which are the same as in Fig. 1, are given the same numerals. In Fig. 2 wall 48a between chambers 46a and 36a is imperforate except for the passage 48b which passes and guides the valve stem 60. Chambers 36a and 46a are consequently separated from each other; and any leakage through 48b around the valve stem is sealed off by a spherical valve formation 42a carried by diaphragm 42 and seating on seat 48c when the diaphragm is in its operating position as shown in the figure. Balance tube 15a connects only to reference chamber 36a of diaphragm 32; and chamber 46a of diaphragm 42 is connected by passage 15b with the engine manifold by being connected directly to the manifold or to the mixture passage beyond the throttle.

The action on starting turn-over is the same as for Fig. 1. Both chambers 34 and 36a of diaphragm 32 are subjected to the cleaner depression via 15a and 13. Chamber 46a of diaphragm 42 is subjected also to cleaner depression via the connection 15b, because regardless of throttle position that depression appears in the mixture passage (manifold) beyond the throttle. At starting turn-over the connection 15b picks up substantially the same total pressure as is picked up by Pitot tube 15. Diaphragm 42 is consequently drawn to the right as shown in Fig. 2 with the same functional results on valve 30 as in Fig. 1. And in the position of Fig. 2 the diaphragm valve 42a, seating on seat 48c cuts off any leakage which might otherwise take place from the air intake via 15a, 36a and 48b to chamber 46a and thus to the engine manifold. Any suitable form of sealing means around the valve stem to seal off the leakage may of course be used either in addition to or in lieu of the sealing valve 42a.

During all phases of engine operation, diaphragm 42 will remain in its right hand position because, regardless of throttle position, the depression obtaining in the engine manifold is always at least as great as the initial, slow air-speed, depression of the air cleaner. At the high air velocity at wide open throttle which may carry the cleaner oil up into the filter plug, the manifold depression is greater than that caused by the hydrostatic head at low velocity. And if the throttle is then suddenly closed the manifold depression, even after the engine speed falls to idling, is still greater than the depression due to the hydrostatic cleaner head. Diaphragm 42 consequently remains in operating position and continues to impose the reference force of spring 52 on valve 30, even though the cleaner may momentarily have lost the hydrostatic head which gives the operative depression at low air speeds. Under all other operating conditions the cleaner depression of at least its hydrostatic head value is applied to the several chambers and diaphragms with the same results as in Fig. 1.

Fig. 3 shows another modification of the devices of Fig. 1. Here the main diaphragm 32 has at one face delivery chamber 34 which, as in Fig. 1, communicates with fuel nozzle 13. The reference pressure chamber 36 is in communication or common with, diaphragm chamber 46 of diaphragm 42, as in Fig. 1; and both chambers 36 and 46 are again connected to Pitot balance tube 15. (As will become apparent, the modification of Fig. 2 is just as applicable to the form of this Fig. 3 as to that of Fig. 1.) Chamber 44 of diaphragm 42, as in Fig. 1, is open to atmosphere. Wall 48 between chambers 36 and 46 merely forms a stop for diaphragms 42 and 32.

Pressure regulating valve 30b is carried by a stirrup 30c on diaphragm 32 and closes onto its seat 30d in a direction against the fluid pressure in initial inlet 38a, instead of with that pressure as in Fig. 1. A spring 40b, adjustable by threaded plug 40c, exerts a pressure tending to close the valve; preferably adjusted to exert substantially just that pressure which will balance the, preferably regulated, inlet fluid pressure on the valve tending to open it.

A spring 80 bears on diaphragm 42 tending to move it to the left in the figure, that is, in a direction out of chamber 46. The two diaphragms are interconnected by a lost motion connection which will tend to move diaphragm 32 to the left, in its valve closing direction, when diaphragm 42 moves to the left. Any kind of lost motion will do, but as here illustrated, it is composed of two inter-engageable fingers 81 and 82 carried by the respective diaphragms. When atmospheric pressure attains in all the diaphragm chambers, when the engine is standing, the parts assume the positions shown in the figure and the pressure of spring 80 is applied, via the lost motion connection, to valve 30b in a closing direction. The valve is thus held closed by the force of that spring; which may be considerable, as it may be anything less than the total force which will be exerted on the area of diaphragm 42 by the depression caused by the air cleaner or equivalent obstruction in the air inlet.

On starting turn-over and on idling operation, both balance tube 15 and nozzle 13 are subjected to the depression of the cleaner or equivalent. Diaphragm 42 is drawn to the right and the pressure of spring 80 is taken off valve 30b. The valve then floats in substantial equilibrium and a slight velocity depression at the venturi will then open it. The operation is then the same as in Fig. 1.

Functionally, the devices of Figs. 1 and 3 are in substance the same. In both devices the operation of diaphragm 42, by cleaner or equivalent pressure drop, changes the forces acting on the pressure regulating valve system so as to put that valve in substantial equilibrium. In both it may be said either that a reference pressure tending to open the valve is effectively added to the forces acting on the valve, or that a valve closing pressure is effectively removed. In Fig. 3 an opening force is effectively added by taking away a closing force; in Fig. 1, a closing force is effectively taken away by adding an opening force.

The specific illustrative embodiments of the invention so far described have included means for directly applying or removing spring pressures to change the reference pressures on the regulating valve. The forms now to be described change the valve operating forces by changing the fluid reference pressure on the valve actuating diaphragm.

In Fig. 4 pressure regulating valve 30 is illustratively shown as closing with the pressure in initial intake 38, and operated by diaphragm 32 which has delivery chamber 34 on one side delivering to nozzle 13. The arrangement is like that of Fig. 1 and subject to the same modifications and comments. Pressure in 34 tends to close the valve, while a reference pressure in the opposite chamber 36e tends to open the valve. As here shown the valve may be closed, when the engine is standing and pressures in 34 and 36e equal, either by the inlet pressure on it, or by the adjustable pressure of a spring 40e, or by both. The total valve closing forces may be substantially as large as the total pressure that is exerted on the effective area of the diaphragm by the pressure drop which is applied from the cleaner or equivalent, and hence can be quite large.

A second or pilot diaphragm 42 has one face exposed in a chamber 46e to the pressure transmitted to it by the Pitot balance tube 15, and its opposite face exposed to pressure in a chamber 44e which, with the engine standing, is open to atmosphere. Diaphragm 42 is pressed by spring arm 100 toward the left in Fig. 4. When in that lef hand position a tube 102, secured to and extending through diaphragm 42 and open at both ends, moves the light spring flap valve 104 to the left off its seat 106 to admit atmosphere from an air filtering chamber or passage 108, through seat 106, into diaphragm chamber 44e. The force exerted by spring 100 on diaphragm 42, and therefore the force that must be exerted on the diaphragm to move it to the right and allow valve 104 to close, is adjustable by the adjusting screw 110. Movement of diaphragm 42 further to the right moves the open end of tube 102 out of contact with seated valve 104 and allows fluid flow through the tube between chambers 44e and 46e. A small notch 112 in the end of tube 102, or equivalent hole in the tube wall, provides for slow equalization of pressures, through the tube when its end is closed by contact with flap valve 104, between chambers 46e and 44e. A passage 114 connects 44e and 36e, making them in effect a single chamber.

Spring 100 is shown as exerting its spring pressure on diaphragm 42 by pressing on buttons 101 located at the sides of tube 102; see Fig. 4a.

On turning over to start, or at idling, the lowered pressure due to the cleaner or equivalent is applied via balance tube 15 to chamber 46e. The total pressure then tending to move diaphragm 42 to the left is the sum of the force exerted by spring 100, and the (lowered) pressure in 46e acting on the diaphragm. Atmospheric pressure in 44e tends to move the diaphragm to the right and close valve 104 and open the end of tube 102. The diaphragm then acts to move the valve and tube in such manner as to maintain equal total pressures on opposite sides of the diaphragm; that is, to maintain fluid pressure in 44e, and 36e, equal to the fluid pressure in 46e plus the pressure exerted by spring 100. If spring 100 has been adjusted to exert a pressure equivalent to that by which valve 30 is closed, when standing, then the pressure in 36e on diaphragm 32 tending to open the valve is just enough in excess over the fluid pressure in 34 (which is the same as that in 46e) to put the valve in balance. Adjustment at 110 to increase the force of spring 100 will then increase the pressure in 36e to open the valve slightly to give the right mixture for starting and idling.

At higher ranges of engine operation the increased pressure drop in the venturi throat is the major factor which opens the valve 30 proportionately to air flow. The slight amount by which the valve is opened by the idling adjustment to make pressure in 36e slightly greater than that necessary to just balance the valve, then becomes negligible. The foregoing statement is true of any of the forms of the invention herein described.

The form of Fig. 4 may be regarded as operating, by virtue of the existence of the relative pressure drop due to the cleaner or equivalent, to apply to the reference chamber of valve operating diaphragm 32 a valve opening reference pressure which is greater than the static pressure in delivery chamber 34. Or it may be regarded as applying the force of spring 100 as an opening force to valve 30, via controlled fluid pressure applied to diaphragm 32.

It is apparent, assuming diaphragms 32 and 42 of equal effective areas, that the standing closing pressure on valve 30 in terms of pressure per unit area of the diaphragms must be not more than the cleaner pressure drop which is applied to 15 and 13. With a cleaner pressure drop of one-half inch water or more, the normal valve closing force may be, say, one-quarter inch.

In effect, the operation of the system of Fig. 4 is to add, to the reference pressure which would normally be applied in 36e to the pressure regulating diaphragm, an additional pressure which is equal to the force exerted by spring 100. In the previously described figures the effectively additional spring force has been applied as such to the valve; here it is applied via a modification in the fluid reference pressure acting on the regulating diaphragm.

In the system of Fig. 4, in parallelism with the showings in Figs. 1–3, there is a means for applying the Pitot tube reference pressure to the main diaphragm. That means comprises the diaphragm 42 and valves 104, 102 and the Pitot connection to chamber 46e. Those parts, acting without spring 100, apply the Pitot reference pressure to diaphragm chambers 44e and 36e. Spring 100 acting in cooperation with valves 102, 104, then acts to impose the additional reference pressure on chambers 44e and 36e, that additional pressure being substantially equal to the normal valve closing force, as in Figs. 1–3.

In Fig. 5 valve 30 and its diaphragm 32 and associated parts are the same as in Fig. 4 and given the same numerals. Delivery chamber 34 is connected by passage 120 with a chamber 122 at one face of the auxiliary diaphragm 124. The other face of that diaphragm is exposed in a reference chamber 126 to the pressure picked up by Pitot balance tube 15. A wall 128 separates chamber 126 from the reference pressure chamber 130 of valve operating diaphragm 32. The stem 132 of a valve 134 extends loosely through wall 128 and is connected to diaphragm 124. The looseness conveniently provides a leak between 126 and 130, which however may be provided in any other convenient manner. Valve 134 when moved to the right by diaphragm 124 seats on seat 136 and closes the atmospheric communication 138 to reference chamber 130. The left hand end of valve stem 132 may simply be contacted by diaphragm 124 when it moves to the right, to move valve 134 to the right. Preferably diaphragm 124 has an opening 140 (see Fig. 5a) through it, closed by a light spring flap valve 142, which engages the end of valve stem 132; valve 142 being opened to tend to equalize pressures at opposite sides of the diaphragm whenever valve 134 is moved onto its seat with some force.

With the engine standing, atmospheric pressure is present in all the chambers 122, 126, 130 and 34, with valve 30 closed by its spring 40e and/or the initial high pressure on it. On turning over to start, the obstruction-decreased pressure, further augmented at first (before valve 30 opens) by the slight depression at the venturi throat, is immediately applied to delivery chamber 34. At that same time the pressure in 122 is slightly less than that in 126 by approximately the amount of the venturi depression, so valve 134 is initially open and atmospheric pressure initially obtains in the main reference chamber 130. The normal closing forces (spring 40e, etc.) on valve 30 being not more than, and preferably less than, the force then exerted on diaphragm 32 toward the right, regulating valve 30 then immediately opens to bring the pressure up in delivery chamber 34 and in chamber 122 at the left of diaphragm 124. Simultaneously, the atmospheric pressure in reference chamber 130 is bleeding down, through the opening in wall 128 about valve stem 132, toward the obstruction-reduced pressure in 126 communicated to it by balance tube 15. At the same time, pressure in the delivery chamber 34, and in the auxiliary reference chamber 122, builds up toward the pressure in main reference chamber 130. When, due to the slow reduction of reference pressure in 130 through the small leak at 132, the pressure in 34 and 122 become slightly greater than the obstruction-reduced pressure in 126, diaphragm 124 moves to the right to close valve 134. Upon that occurring the leak between 126 and 130 then tends to bring the reference pressure in 130 to the balance pressure (the obstruction reduced pressure) of Pitot tube 15. As the pressure in 130 falls the delivery pressure in 34 and 122 tends to fall, moving diaphragm 124 to the left and allowing valve 134 to open to increase the reference pressure in 130. That action keeps the delivery pressure in 34 approximately equal to the balance tube pressure, keeping the reference pressure in 130 equal to the balance tube pressure plus the normal closing pressure exerted on valve 30. As in the form of Fig. 4, the normal valve closing pressure must be not greater than the cleaner pressure drop on the effective diaphragm area.

On rapid deceleration of the engine by sudden throttle closing and when, due to sluggishness of the main valve 30 in closing, pressure in 34 and 122 tends to increase above that in 126, diaphragm 124 moving toward the right will open relief valve 142 to equalize pressures between 126 and 122 and 34.

The action of the form shown in Fig. 5 may be described functionally as that of applying to the regulating diaphragm a valve opening reference pressure which is automatically maintained substantially equal to the static pressure which is applied to the delivery chamber plus the force by which the valve is normally seated when opposing pressures on the diaphragm are equal. The leak at 132 may be regarded as the means of applying the Pitot balance pressure to diaphragm 32 as reference pressure. Then the diaphragm 124, operating valve 134 under the action of the opposing pressures in 126 and 122, is the means for applying to main diaphragm 32, from the atmosphere, an additional reference pressure substantially equal to the normal valve closing force. And, as in Figs. 1–4, the means, here in Fig. 5, for applying that additional reference pressure comprises the diaphragm 124 and its valve 134 actuated by the presence of the cleaner-dropped pressure in 126.

Fig. 6 shows a further modification, similar in some respects to that of Fig. 5. Here in Fig. 6, valve 30, diaphragm 32, delivery chamber 34 and reference chamber 130 with its atmospheric communication 138, are the same as in Fig. 5. A spring flap valve 134a seats on the end of the atmospheric communication with sufficient force to close that communication when the dropped pressure due to the cleaner is present in 130. A valve operating pin 132a extends loosely through the wall 128a that separates reference chamber 130 from chamber 122a which is connected by passage 120a with outlet chamber 34 and which lies at one side of the auxiliary diaphragm 124a. At the other side of diaphragm 124a there is a reference chamber 126a with which Pitot tube 15 communicates. A spring 150 presses diaphragm 124a to the right and balances the opposing pressure of spring valve 134a. When, as it is in operation, valve 134a is moved to the right off its seat, the system of valve 134a and diaphragm 124a is in floating balance free to respond to relative changes in the outlet or delivery pressure in chamber 122a.

Comparing Fig. 6 as thus far explained with Fig. 5, it will be seen that in essence they are substantially the same. In both, the auxiliary diaphragm 124 or 124a has the balance pressure of Pitot tube 15 on one face and the delivery pressure on the other. And in both, the valve 134 or 134a, controlling atmospheric connection 138 to reference chamber 130, is opened by movement of diaphragm 124a into the delivery pressure chamber 122 or 122a. The only diffference between the two forms is that in Fig. 6 the leak or bleed around loose pin 132a from reference chamber 130 leads to the delivery pressure in chamber 122a, whereas in Fig. 5 that leak goes to the balance tube pressure in chamber 126. However, as in operation the delivery pressure in 122a and 34 is constantly kept substantially equal to the balance pressure, the form of Fig. 6 operates in all respects like that of Fig. 5. In both forms the leak is a vent through which the higher pressure in 130 bleeds off. The pressures on opposite sides of diaphragm 124a are kept equal; that is, the delivery pressure in 34 is kept equal to the balance pressure; and that is done by maintaining the reference pressure in 130 equal to the balance and delivery pressure plus the normal closing force on valve 30. The form of Fig. 6 does however have the advantage that the Pitot balance tube 15 leads to a chamber (126a) through which there is no flow, as there is through chamber 126 in Fig. 5. In installations where the balance tube has to be quite long there is, in Fig. 5, apt to be some sluggishness in the flow which takes place from chamber 130 into chamber 126. But in Fig. 6, where the connection 120a between 122a and 34 is short and can be as large as desired, such sluggishness does not occur in the flow from 130 into 122a.

The function of the valve 142a of Fig. 6 is the same as that of valve 142 in Fig. 5. With diaphragm 124a in position to press valve 134a off its seat, valve 142a closes a passage 140a through wall 128a. On quick deceleration when delivery pressure in 34 and 122 tend to rise because of sluggishness of pressure drop in 130 through the leak into 122a, diaphragm 124a will temporarily move to the left in Fig. 6, and the finger 142b will pull valve 142a off its seat, opening passage 140a for quick relief of pressure from 130 to 122a.

A further structural modification is possible in the form of Fig. 6. In the arrangement shown in that figure, when valve 134a is open, the plate of diaphragm 124a may at the same time move to a seating position on the seat 132b at the end of the passage through which pin 132a extends. Closing that leak passage, with atmospheric communication 138 open has the same effect as opening valve 134a with the leak open. Consequently the valvular action at 132b can either be used in conjunction with that at 134a; or valve 134a and its operating pin can be dispensed with, and the valvular action at 132b can perform the whole function, the passages at 138 and 132b being properly sized. On the other hand, seat 132b may be cut off short so that the diaphragm plate will not contact it at all, in which case the valve 134a solely performs the described functions of maintaining the pressure in 130 at the proper point.

In summation, a few general remarks about the several different modifications may help in an understanding of the functioning and the extent of the invention.

In all of the several forms described, use is made of the dropped or diminished pressure due to the air intake obstruction, that is, of the difference between that pressure and that of the effective surrounding atmosphere; or, for short, of the drop in pressure due to the obstruction (e. g. cleaner). That pressure drop is utilized in all the various forms to control, in one manner or another, the application to the regulating valve of an effective valve-opening reference pressure which is greater than that exerted on the valve operating diaphragm by the obstruction-diminished pressure; the measure of the excess reference pressure being the force by which the regulating valve is normally closed.

In Figs. 1, 2 and 3, the excess reference pressure is, under control of the obstruction-drop in pressure, applied to the valve operating system directly as spring pressure. In Fig. 4, the spring pressure is applied to the valve via extra fluid pressure (from atmosphere) on its diaphragm. And in Figs. 5 and 6 the excess reference pressure is, under control of an auxiliary diaphragm, applied as fluid pressure derived from atmosphere under control of the obstruction-dropped pressure.

In all of the various forms, if the equivalent diaphragm pressure corresponding to the normal valve closing force be kept less than that which is due to the obstruction pressure drop, any reasonable variation in the latter is automatically taken care of. And in the forms of Figs. 5 and 6 any reasonable variations in the normal closing force on the regulating valve (e. g. variations in the initial inlet pressure) are also automatically compensated.

The forms of Figs. 1 to 3 herein are the subject matter of my application Ser. No. 654,276, filed April 22, 1957, as a division of this application.

I claim:

1. In gaseous fuel feed systems for internal combustion engines and the like, the combination of an air and mixture passage having an outlet to the engine intake manifold, an air intake and a venturi throat between intake and outlet, a permanent obstruction in the air intake positively imposing a pressure reduction with relation to atmospheric pressure on the air passing therethrough at minimum flow, a gas pressure regulator comprising a pressure regulating valve controlling gas flow from an initial inlet to a delivery chamber, a diaphragm-valve system including said valve and a valve operating diaphragm having one face exposed to fluid pressure in the delivery chamber and the other face exposed to fluid pressure in a reference chamber, the fluid pressure in the delivery chamber exerting a force on said diaphragm tending to move it in a valve closing direction and the fluid pressure in the reference chamber exerting a force on said diaphragm tending to move it in a valve opening direction, means applying an additional definite force to the diaphragm-valve system whereby the valve is normally closed with a definite pressure when fluid pressures on opposite faces of the valve operating diaphragm are equal, a gas delivery passage leading from the delivery chamber to the venturi throat, a means which picks up the pressure existent in the air and mixture passage at a point downstream of the obstruction and means actuated by virtue of the existence of obstruction reduced pressure in said pick-up means, with relation to atmospheric pressure, to apply to the diaphragm-valve system a force, acting in a valve opening direction, of such magnitude as to cause the sum of all forces acting on that system in a valve opening direction to be substantially equal to the sum of all forces acting on that system in a valve closing direction, said last mentioned means comprising an auxiliary diaphragm opposite faces of which are exposed to the pressure of the delivery chamber and to the obstruction-reduced pressure picked up by the pick-up means, the reference pressure chamber of the valve operating diaphragm being restrictedly vented to tend to leak its pressure down to the obstruction-reduced pressure, and a valve actuated by said auxiliary diaphragm and acting to control communication of atmospheric pressure to said reference pressure chamber.

2. The combination defined in claim 1 and in which the reference pressure chamber is vented to a passage leading to the pick-up means.

3. In gaseous fuel feed systems for internal combustion engines and the like, the combination of an air and mixture passage having an outlet to the engine intake manifold, an air intake and a venturi throat between intake and outlet, a permanent obstruction in the air intake positively imposing a pressure reduction with relation to atmospheric pressure on the air passing therethrough at minimum flow, a gas pressure regulator comprising a pressure regulating valve controlling gas flow from an initial inlet to a delivery chamber, a diaphragm-valve system including said valve and a valve operating diaphragm having one face exposed to fluid pressure in the delivery chamber and the other face exposed to fluid pressure in a reference chamber, the fluid pressure in the delivery chamber exerting a force on said diaphragm tending to move it in a valve closing direction and the fluid pressure in the reference chamber exerting a force on said diaphragm tending to move it in a valve opening direction, means applying an additional definite force to the diaphragm-valve system whereby the valve is normally closed with a definite pressure when fluid pressures on opposite faces of the valve operating diaphragm are equal, a gas delivery passage leading from the delivery chamber to the venturi throat, a means which picks up the pressure existent in the air and mixture passage at a point downstream of the obstruction, and means actuated by virtue of the existence of obstruction reduced pressure in said pick-up means, with relation to atmospheric pressure, to apply to the diaphragm-valve system a force, acting in a valve opening direction, of such magnitude as to cause the sum of all forces acting on that system in a valve opening direction to be substantially equal to the sum of all forces acting on that system in a valve closing direction, said last mentioned means including an auxiliary diaphragm exposed on one face to the fluid pressure existent in the delivery chamber, means forming a reference chamber at the other face of the auxiliary diaphragm, to which chamber the obstruction-reduced pressure picked up by the pick-up means is applied, a communication venting the reference chamber of the valve operating diaphragm to the obstruction-reduced pressure, a communication between atmosphere and the reference chamber of the valve operating diaphragm, and valvular means operated by the auxiliary diaphragm to controllably vary the effective size of one of said communications.

4. The combination defined in claim 3 and in which one of the said two communications is a leak passage of fixed size, and the valvular means controllably varies the effective size of the other communication.

5. In gaseous fuel feed systems for internal combustion engines and the like, the combination of an air and mixture passage having an outlet to the engine intake manifold, an air intake and a venturi throat between intake and outlet, a permanent obstruction in the air intake positively imposing a pressure reduction with relation to atmospheric pressure on the air passing therethrough at minimum flow, a gas pressure regulator comprising a pressure regulating valve controlling gas flow from an initial inlet to a delivery chamber, a diaphragm-valve system including said valve and a valve operating diaphragm having one face exposed to fluid pressure in the delivery chamber and the other face exposed to fluid pressure in a reference chamber, the fluid pressure in the delivery chamber exerting a force on said diaphragm tending to move it in a valve closing direction and the fluid pressure in the reference chamber exerting a force on said diaphragm tending to move it in a valve opening direction, means applying an additional definite force to the diaphragm-valve system whereby the valve is normally closed with a definite pressure when fluid pressures on opposite faces of the valve operating diaphragm are equal, a gas delivery passage leading from the delivery chamber to the venturi throat, a means which picks up the pressure existent in the air and mixture passage at a point downstream of the obstrucion, and means actuated by virtue of the existence of obstruction reduced pressure in said pick-up means, with relation to atmospheric pressure, to apply to the diaphragm-valve system a force, acting in a valve opening direction, of such magnitude as to cause the sum of all forces acting on that system in a valve opening direction to be substantially equal to the sum of all forces acting on that system in a valve closing direction, said last mentioned means including an auxiliary diaphragm exposed on said face to the fluid pressure existent in the delivery chamber, means forming a reference chamber at the other face of the auxiliary diaphragm, to which chamber the obstruction-reduced pressure picked up by the pick-up means is applied, a communication venting the reference chamber of the valve operating diaphragm to the obstruction-reduced pressure, a communication between atmosphere and the reference chamber of the valve operating diaphragm, and valvular means operated by the auxiliary diaphragm and acting to reduce the relative effective size of the atmospheric communication when the auxiliary diaphragm moves in the direction of its reference chamber to which the obstruction-reduced pressure is applied.

6. The combination defined in claim 5 and including also a second valvular means operated by the auxiliary diaphragm and acting to interconnect the reference chamber of the auxiliary diaphragm with the delivery chamber when the first mentioned valvular means acts to close down the atmospheric communication.

References Cited in the file of this patent
UNITED STATES PATENTS

| | | |
|---|---|---|
| 2,448,131 | Williams | Aug. 31, 1948 |
| 2,475,086 | Ensign | July 5, 1949 |
| 2,563,228 | Ensign | Aug. 7, 1951 |
| 2,698,226 | Peduzzi | Dec. 28, 1954 |

UNITED STATES PATENT OFFICE

CERTIFICATE OF CORRECTION

Patent No. 2,799,564                                                          July 16, 1957

Roy F. Ensign

It is hereby certified that error appears in the printed specification of the above numbered patent requiring correction and that the said Letters Patent should read as corrected below.

Column 10, line 55, after "obstruction" insert a comma; column 12, line 29, for "said face" read --one face--.

Signed and sealed this 17th day of September 1957.

(SEAL)
Attest:
KARL H. AXLINE
Attesting Officer

ROBERT C. WATSON
Commissioner of Patents